United States Patent [19]

Fujioka et al.

[11] Patent Number: 4,843,476
[45] Date of Patent: Jun. 27, 1989

[54] SYSTEM FOR CONTROLLING THE AMOUNT OF LIGHT REACHING AN IMAGE PICK-UP APPARATUS BASED ON A BRIGHTNESS/DARKNESS RATIO WEIGHING

[75] Inventors: Atsushi Fujioka, Neyagawa; Atsushi Morimura, Nara; Yoshinori Kitamura; Hiroki Matsuoka, both of Takatsuki, all of Japan

[73] Assignee: Matsushita Electric Industrial Co., Ltd., Osaka, Japan

[21] Appl. No.: 123,539

[22] Filed: Nov. 20, 1987

[30] Foreign Application Priority Data

Nov. 25, 1986 [JP] Japan .................................. 61-280171
Apr. 10, 1987 [JP] Japan .................................. 62-89438

[51] Int. Cl.⁴ ...................... H04N 5/235; H04N 5/238
[52] U.S. Cl. ................................. 358/228; 358/213.19
[58] Field of Search .................... 358/228, 213.19, 225, 358/55

[56] References Cited

U.S. PATENT DOCUMENTS 4,516,172 5/1985 Miyata et al. ........................ 358/228
4,638,350 1/1987 Kato et al. ............................ 358/29
4,717,960 1/1988 Shikano et al. ...................... 358/228

FOREIGN PATENT DOCUMENTS 58-38075 3/1983 Japan .

Primary Examiner—James J. Groody
Assistant Examiner—Robert M. Bauer
Attorney, Agent, or Firm—Stevens, Davis, Miller & Mosher

[57] ABSTRACT

A light signal control circuit for an image pick-up apparatus detects a substantially peak value of image pick-up signals by a first level detection circuit, detects a substantially average value of the image pick-up signals by a second level detection circuit, determine a brightness condition of an object by a decision circuit, weights the outputs of the first level detection circuit and the second level detection circuit by a weighting circuit, and controls the amount of light reaching an image pick-up apparatus in accordance with an output of the weighting circuit. Optimum light control corresponding to the brightness condition of the object is attained by controlling the weighting operation in accordance with an output of the decision circuit.

27 Claims, 12 Drawing Sheets

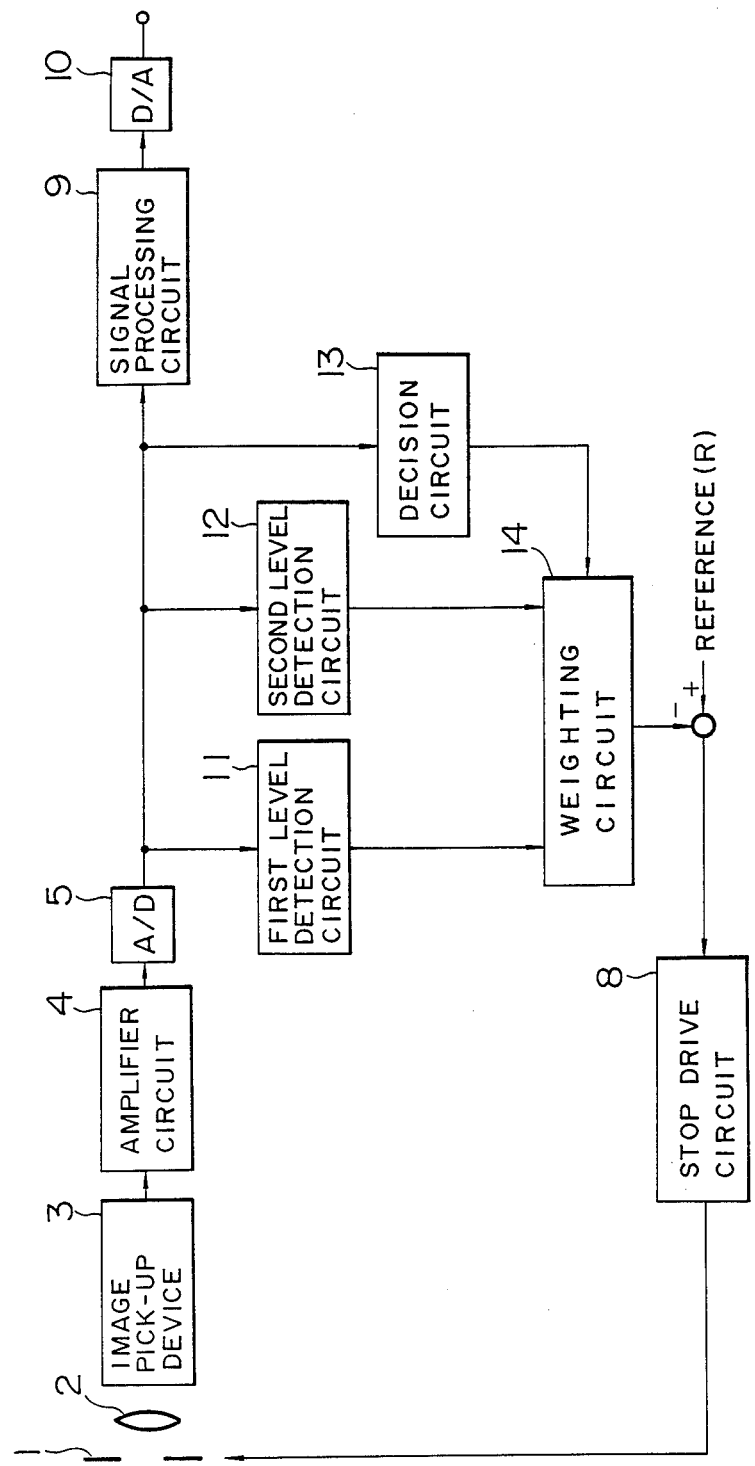

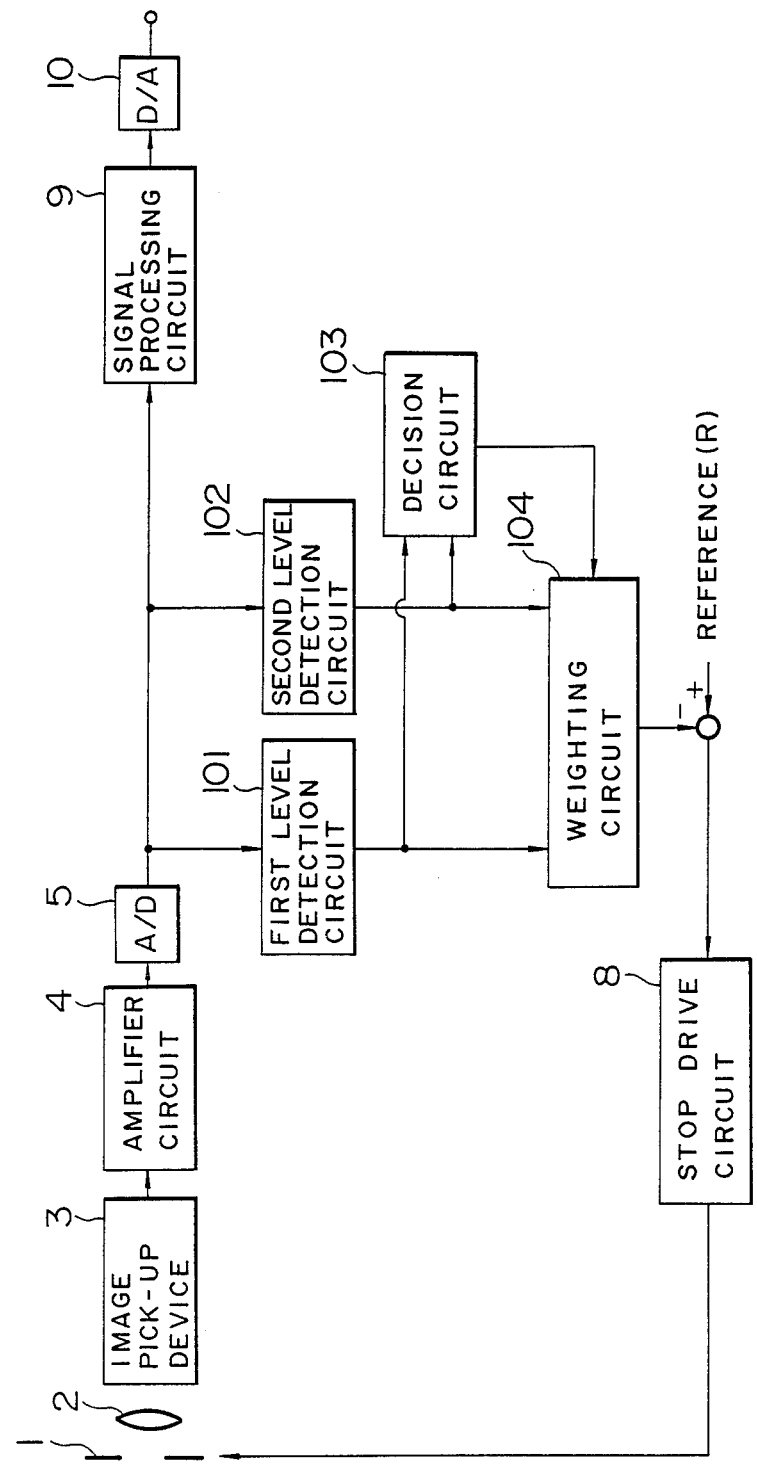

FIG. 8

| B1 | B2 | B3 | B4 | B5 |
|----|----|----|----|----|
| B6 | B7 | B8 | B9 | B10 |
| B11 | B12 | B13 | B14 | B15 |
| B16 | B17 | B18 | B19 | B20 |
| B21 | B22 | B23 | B24 | B25 |

FIG. 9

|  |  |  |  |  |
|---|---|---|---|---|
|  | B7 | B8 | B9 |  |
|  | B12 | B13 | B14 |  |
|  | B17 | B18 | B19 |  |
|  | B22 | B23 | B24 |  |

SYSTEM FOR CONTROLLING THE AMOUNT OF LIGHT REACHING AN IMAGE PICK-UP APPARATUS BASED ON A BRIGHTNESS/DARKNESS RATIO WEIGHING

BACKGROUND OF THE INVENTION

The present invention relates to a light signal control circuit for an image pick-up apparatus, for example, a stop control circuit having an automatic stop circuit for effecting stop correction which is effective when taking a picture against counter-light or the like where a great variation of brightness is involved.

Conventional stop control of an image pick-up apparatus has been performed by a method which combines a peak value system with an average value system. Such a conventional image pick-up apparatus is disclosed in JP-A-58-38075. FIG. 1 is a block diagram showing this conventional image pick-up apparatus. In FIG. 1, reference numeral 1 designates a stop, numeral 2 a lens, numeral 3 an image pick-up device such as a CCD, numeral 4 an amplifier circuit for amplifying a signal from the image pick-up device 3 and producing an image pick-up signal of a predetermined level, numeral 5 an analog-to-digital conversion circuit, numeral 6 a peak value detection circuit for detecting a peak value of the image pick-up signal, numeral 7 an average value detection circuit for detecting an average value of the image pick-up signal, numeral 8 a stop drive circuit for driving a stop, numeral 9 a signal processing circuit for effecting gamma processing or the like, and numeral 10 a digital-to-analog conversion circuit.

In a conventional image pick-up apparatus constructed as described above, the stop drive circuit 8 drives the stop 1 so that a sum of a signal from the peak value detection circuit 6 and an output signal from the average value detection circuit 7 becomes equal to a reference value "R" (shown in FIG. 1).

This conventional construction, however, has a disadvantage that an output signal of the peak value detection circuit becomes so large that the stop is closed undesirably to render an object dark when taking a picture of an object in an environment having a great brightness variation by including a light source or against counter-light.

SUMMARY OF THE INVENTION

An object of the present invention is to provide a stop control circuit for an image pick-up apparatus having a corrective function of preventing an object from becoming dark by determining a condition of counter-light or the like having a large ratio or difference between brightness and darkness in a sensing area and opening the stop.

In order to accomplish the above-mentioned object and the others, there is provided according to the present invention a stop control circuit for an image pick-up apparatus comprising a first level detection circuit for detecting a substantial peak value of an image pick-up signal, a second detection circuit for detecting a substantial average level of an image pick-up signal, a decision circuit for determining a condition of brightness and darkness of a sensing area, a weighting circuit for weighting an output of the first level detection circuit and an output of the second level detection circuit, and a stop control circuit for controlling the stop in accordance with an output of the weighting circuit. With the above-described construction, when the decision circuit decides that an image of an object is picked up in an ordinary condition, i.e., when a ratio or difference between brightness and darkness of the object is small, the weighting circuit weights an output of the first level detection circuit, thereby controlling the stop to obtain a non-saturated image pick-up signal, while, when the decision circuit decides that an image of an object is picked up against counter-light, the weighting circuit weights an output of the second level detection circuit, thereby controlling the stop to prevent the object from becoming dark under the influence of a light source or the like.

While the novel features of this invention are set forth with particularity in the appended claims, the invention, both as to the organization and content, will be better understood and appreciated, along with the other objects and features thereof, from the following detailed description taken in conjunction with the accompanying drawings.

BRIEF DESCRIPTION OF THE DRAWINGS

FIG. 4 is another block diagram showing the principle of the present invention.

FIG. 5 is a block diagram showing first, second and third embodiments of the present invention.

FIGS. 8 and 9 are explanatory diagrams showing the segmented blocks of an image pick-up screen in the second and third embodiments.

DESCRIPTION OF THE PREFERRED EMBODIMENTS

Figure 2:
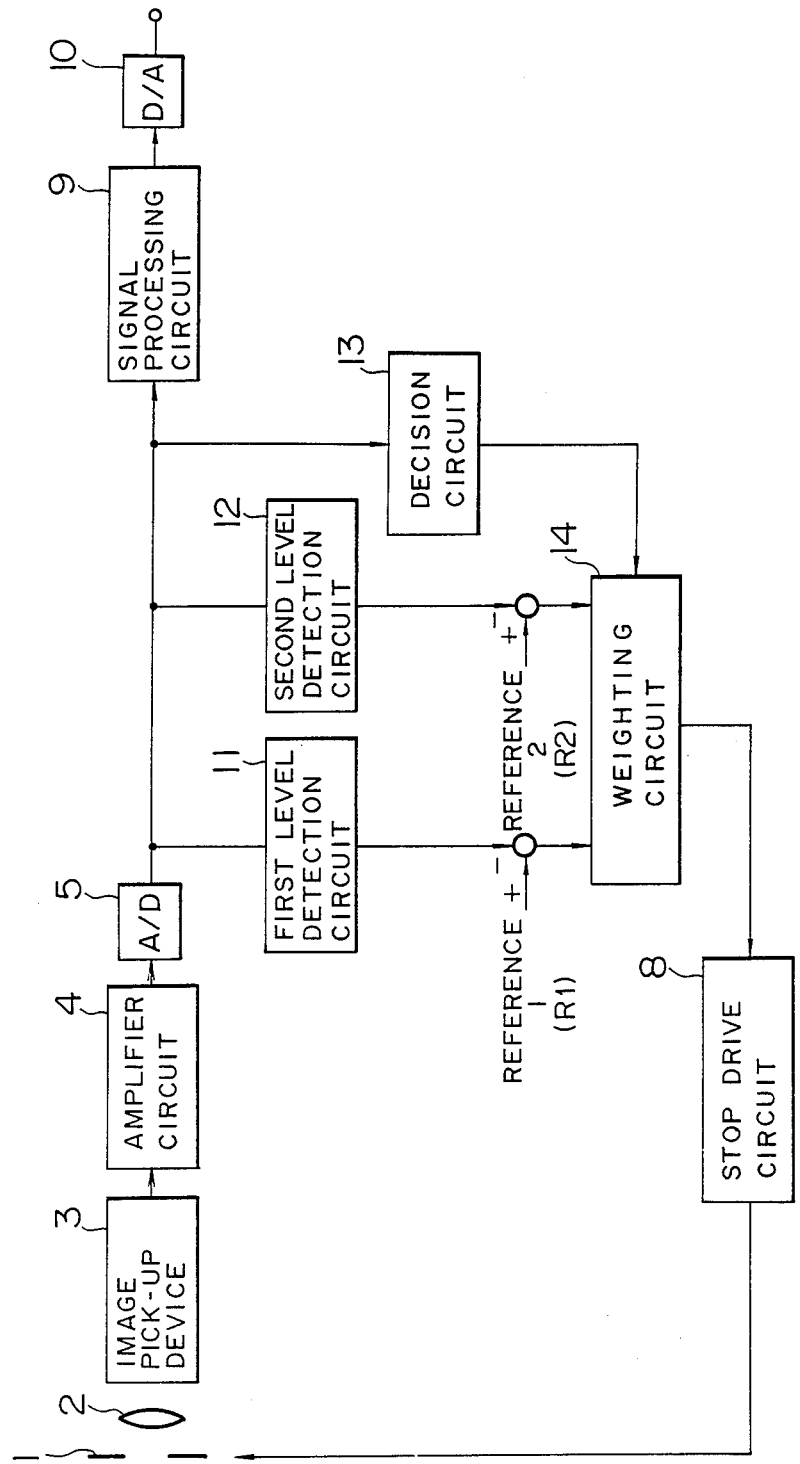
FIG. 2 is a block diagram showing the principle of the present invention.

FIG. 2 is a block diagram for explaining the principle of the present invention. The same parts of the apparatus as those of the conventional apparatus will be designated by the same reference numerals and will not be described in detail.

In FIG. 2, numeral 11 designates a first level detection circuit for detecting a signal having a large amplitude (namely, a substantial peak value) of image pick-up signals, numeral 12 a second level detection circuit for detecting an average level of image pick-up signals, numeral 13 a decision circuit for determining a ratio (brightness ratio) of brightness and darkness of a sensing area, numeral 14 a weighting circuit for weighting a comparison output signal obtained by comparing an output signal from the first level detection circuit with a reference value 1 and a comparison output signal obtained by comparing an output signal from the second level detection circuit with a reference value 2, respectively.

The operation of an image pick-up apparatus according to the present invention constructed as described above will be explained below.

Figure 1:
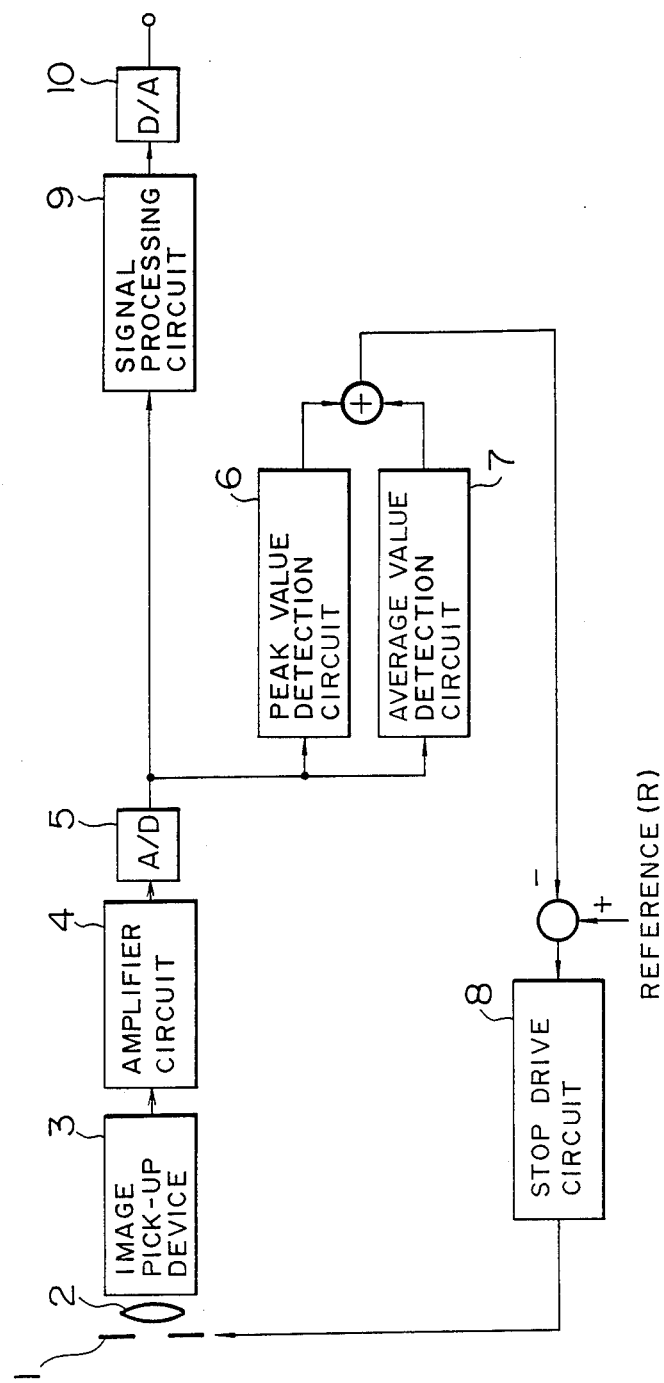
FIG. 1 is a block diagram showing a conventional image pick-up system.

The first level detection circuit 11 performs level detection substantially similar to that of the peak value detection circuit 6 of the conventional image pick-up apparatus shown in FIG. 1. By setting the reference value 1 to a suitable value, nonsaturation control of an image pick-up signal is made possible by controlling an output of the first level detection circuit 11 so that it becomes equal to the reference value 1. The second level detection circuit 12, on the other hand, performs level detection substantially similar to that of the average value detection circuit 7 of the conventional image pick-up apparatus shown in FIG. 1. As a result, if the reference value 2 is suitably set, by controlling an output of the second level detection circuit 12 so that it becomes equal to the reference value 2, it becomes possible to perform opened stop control, since the apparatus is less affected by a bright part of a sensing area such as a light source as compared with the conventional stop control using the peak value detection circuit 6. In the present invention, the decision circuit 13 is used to discriminate whether the system is picking up an image of an object having a large brightness-to-darkness ratio including a light source or not. When the decision circuit 13 determines a condition where an image of an ordinary object having a small brightness-to-darkness ratio is picked up, the weighting circuit 14 selects a comparison output signal which is obtained by a comparison between an output signal of the first level detection circuit 11 and the reference value 1, and supplies the comparison output signal to the stop drive circuit 8, thereby making it possible to perform signal saturation preventing stop control. When the decision circuit 13 determines a condition where an image of an object having a large brightness-to-darkness ratio, e.g. including a light source or the like is picked up, on the other hand, the weighting circuit 14 selects a comparison output signal which is obtained by a comparison between an output signal of the second level detection circuit 12 and the reference value 2, and supplies the comparison output signal to the stop drive circuit 8. Thus, it becomes possible to perform opened stop control, thereby preventing the object from becoming dark, which has been a problem of the prior art caused by the fact that the stop is closed under the influence of a bright part such as a light source.

In order to accomplish the above-mentioned control, the operation described below is performed by the weighting circuit 14.

Assuming that "Peak" is an output signal of the first level detection circuit 11, "Ave" an output signal of the second level detection circuit 12, "R1" the reference value 1, and "R2" the reference value 2, then the weighting circuit 14 produces an output signal C defined by the equation shown below.

$$C = m \cdot (R2 - Ave) + (1-m) \cdot (R1 - Peak) \quad (1)$$

Figure 3:
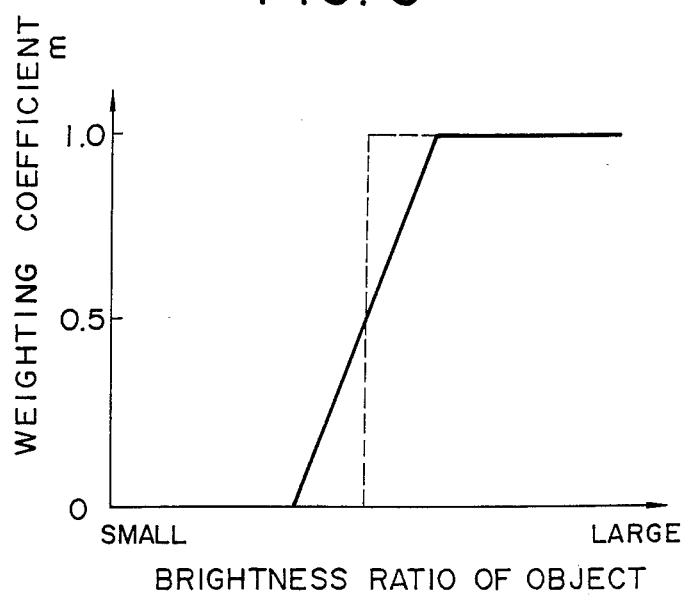
FIG. 3 is a characteristic diagram showing the characteristics of the weighting circuit 14 shown in FIG. 2.

In equation (1), m is a weighting coefficient (or a weighting factor). The operation of the weighting circuit 14 is indicated by a solid line in FIG. 3. In FIG. 3, the abscissa represents an output of the decision circuit 13, that is, the magnitude of a brightness-to-darkness ratio of an object or a sensing area, and the ordinate represents the weighting coefficient m. When the brightness-to-darkness ratio of the object is small, m=0 results. In this case, the weighting circuit 14 outputs a comparison output signal which is obtained by a comparison between an output of the first level detection circuit 11 and the reference value 1, thereby making it possible to perform signal saturation preventing control. When the brightness-to-darkness ratio of the object is large, on the other hand, m=1 results, in which case the weighting circuit 14 outputs a comparison output signal which is obtained by a comparison between an output of the second level detection circuit 12 and the reference value 2, thereby making it possible to perform opened stop control. In FIG. 3, the stop may be operated smoothly without any sudden change in the operation by smoothly changing the weighting coefficient m in a region where the brightness-to-darkness ratio of an object has an intermediate value. The broken line in FIG. 3 shows another example of operation of the weighting circuit 14. The characteristic shown by the broken line represents a control mode which switches the weighting coefficient m simply in accordance with the magnitude of the brightness-to-darkness ratio of an object.

As explained above, the present invention can realize the characteristic of an optimum stop operation in accordance with the brightness-to-darkness ratio of an object or a sensing area.

The stop control circuit of the present invention may alternatively be constructed as shown in FIG. 4. The construction shown in FIG. 4 is different from that of FIG. 2 in that, in FIG. 4, a comparison output signal obtained by comparing an output signal of the weighting circuit 14 with a reference value is applied to the stop drive circuit 8 to thereby control the operation of the stop 1. In this case, assuming that "Peak" represents an output signal of the first level detection circuit 11, "Ave" represents an output signal of the second level detection circuit 12, and "m" represents the weighting coefficient, then, by comparing the output signal D of the weighting circuit 14 obtained from the following equation (2) with a reference value, it becomes possible to perform stop control similar to that attained by the construction shown in FIG. 2.

$$D = m \cdot Ave + (1-m) \cdot Peak \quad (2)$$

Particularly, the equation (1) may be modified to result a follows:

$$C = R_1 + m \cdot (R_2 - R_1) - (m \cdot Ave + (1-m) \cdot Peak)$$

In FIG. 4, on the other hand, if an input signal to the stop drive circuit 8 is denoted by E, the following equation results.

$$E = R - (m \cdot Ave + (1-m) \cdot Peak)$$

where R is a reference value shown in FIG. 4. Therefore, if the reference value 1 is substantially equal to the reference value 2, an equivalent characteristic can be obtained by making the reference value of FIG. 4 equal to the reference value 1 or 2. If the reference value of FIG. 4 is made equal to the reference value 1 ($R = R_1$), and if the weighting circuit 14 produces an output signal of the value F given by the following equation (3)

$$F = m \cdot (Ave - (R_2 - R_1)) + (1-m) \cdot Peak. \quad (3)$$

then, the value G of the input signal to the stop drive circuit 8 is given by $$G = R_1 - m \cdot (Ave - (R_2 - R_1)) - (1-m) \cdot Peak.$$

Since the modification of this equation results in an equation equal to the equation (1) as explained above, it is possible to make the construction of FIG. 4 have the same characteristics as that of the construction of FIG. 2. As described above, in the present invention, the construction of either FIG. 2 or FIG. 4 may be used with equal effect. Therefore, the embodiments of the present invention described hereunder are shown to have the construction of FIG. 4. However, it is clear that a similar effect can be obtained by using the construction of FIG. 2.

The principle of determining the brightness-to-darkness ratio of an object or a sensing area by the decision circuit 13 of the present invention will be explained in detail with reference to the embodiments of the present invention described hereunder. The decision circuit 13 can determine the brightness-to-darkness ratio of an object by inputting a signal from the first level detection circuit 11, the second level detection circuit 12 or any other level detection circuit, which will also be explained in detail hereunder with reference to the embodiments of the present invention.

In the principle of this invention mentioned above, as a means for controlling a light signal, a stop has been used. However, a means for controlling a light signal is not limited to a conventional stop.

It is obvious for those skilled in the art that a liquid crystal can be utilized as a controlling means for controlling a light signal. Further, by controlling an amount of charges stored in a photo sensing element of an image sensing device, such as CCD, the same effect can also be accomplished.

FIG. 5 is a block diagram showing an image pick-up system according to a first embodiment of the present invention. In FIG. 5, the first level detection circuit 101, the second level detection circuit 102, the decision circuit 103 and the weighting circuit 104 have the same functions as the first level detection circuit 11, the second level detection circuit 12, the decision circuit 13 and the weighting circuit 14 shown in FIG. 4, respectively. The same construction as that of the conventional apparatus will be designated by the same reference numerals as those used in the latter and will not be explained in detail.

The operation of the image pick-up system according to this embodiment will be explained below.

Figure 6:
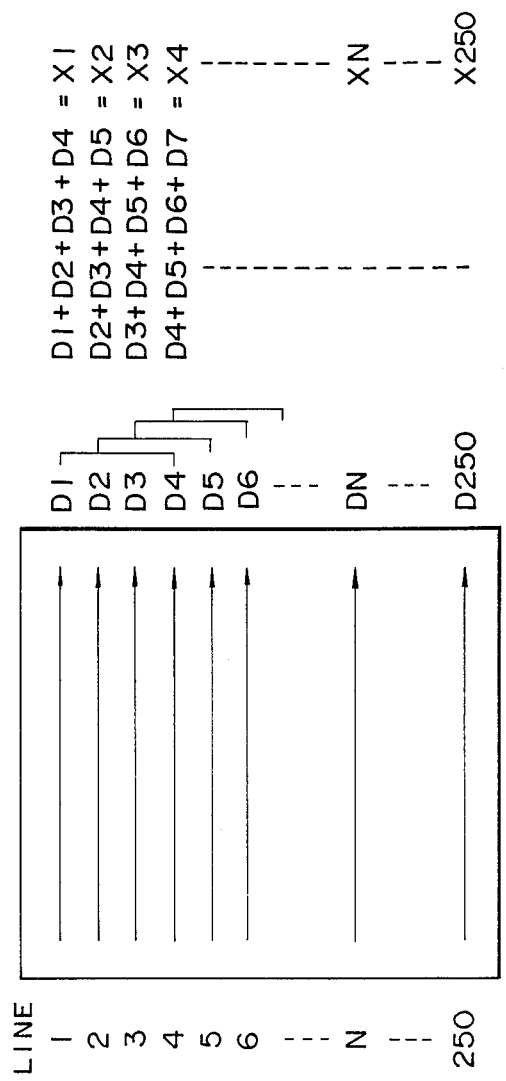
FIG. 6 is an explanatory diagram showing the principle of the first level detection circuit 101 shown in FIG. 5.

The first level detection circuit 101 divides a sensing area into a plurality of small regions and determines an average value of the levels in each of the small regions and then detects a maximum value of the average values. FIG. 6 is an explanatory diagram for explaining the principle of the operation of the first level detection circuit 101. Each small region is assumed to cover an area defined by eight picture elements in the horizontal direction and four lines in the vertical direction of an image pick-up device 3, for example. This area is about 3% of the effective area of the sensing area (for an image pick-up device having 420 picture elements in the horizontal direction and 500 lines in the vertical direction). In FIG. 6, the largest value of respective arithmetic means of data of the eight successive picture elements is determined for each of the lines (D1, D2, D3, ... DN, ..., D250). Then, successive four of the largest values are added together in the vertical direction to obtain the data (X1, X2, X3, XN, X250), and a maximum value of the data is determined. Thus, a maximum value of the respective average values of the data of the small regions, each defined by eight picture elements in the horizontal direction and four lines in the vertical direction, is equivalently obtained. The second level detection circuit 102 detects an average value of the whole image screen or sensing area.

Now, an explanation will be made of the operation of the decision circuit 103 and the weighting circuit 104.

The decision circuit 103 determines and outputs a value representing a ratio between an output signal of the first level detection circuit 101 and an output signal of the second level detection circuit 102 (such a value is represented by K). Assuming that "Peak" indicates an output signal of the first level detection circuit and "Ave" indicates an output signal of the second level detection circuit, $$K = Peak/Ave. \quad (4)$$

Generally, when picking up an image of an object having a large brightness-to-darkness ratio including a light source or the like, the level (Peak) corresponding to a bright part becomes higher and therefore the value of K becomes larger, whereby it is possible to determine whether the object has a large brightness-to-darkness ratio by including a light source or the like, on the basis of the magnitude of the value K.

The weighting circuit 104 produces a value T obtained by the following equation (5).

$$T = Ave \cdot m + Peak \cdot (1-m) \quad (0 \leq m \leq 1). \quad (5)$$

Figure 7:
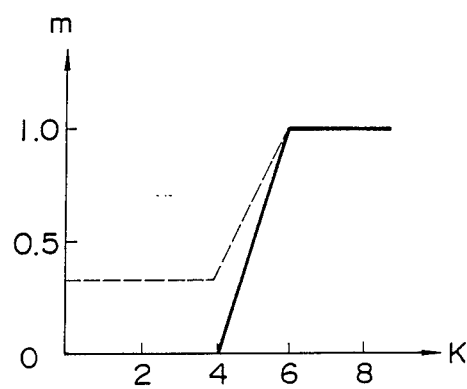
FIG. 7 is a characteristic diagram showing the characteristics of the weighting circuit 104 shown in FIG. 5.

In this equation, the weighting coefficient m is determined depending on the output signal of the decision circuit 103. The operation of the weighting circuit 104 is illustrated by a solid line in FIG. 7. In FIG. 7, the weighting circuit 104 makes the value of m equal to zero when K is smaller than 4 and thereby uses the output signal of the first level detection circuit 101 to control the stop so as to eliminate signal saturation. On the other hand, the weighting circuit 104 makes the value of m equal to one when K is greater than 6 and thereby selects the output signal of the second level detection circuit 102 to control the stop so as to reduce the effect of the bright part such as a light source. Another example of operation of the weighting circuit 104 is indicated by the broken line in FIG. 7. In FIG. 7, when K is smaller than 4, the stop is controlled by a level indicative of a combination of an output signal of the first level detection circuit 101 and an output signal of the second level detection circuit 102. In this case, by changing the weighting coefficient m, an optional stop characteristic can be set. If the weighting coefficient m is increased with K smaller than four, for instance, the stop control approaches the one using an average value. The stop characteristic varies in a small degree when K is near five. Further, the operation of the weighting circuit 104 is not confined to the examples described above.

As explained above, according to this embodiment, the decision circuit 103 determines the condition of brightness or darkness of an object or a sensing area. When an image of an object having a small brightness-to-darkness ratio is picked up, the stop is controlled to eliminate signal saturation, while, when an image of an object having a large brightness-to-darkness ratio is picked up, the stop control is effected to prevent the object from becoming dark. As a result, it becomes possible to produce an excellent image. Further, in the aforementioned embodiment, the first level detection circuit 101 operates to obtain an average value for each of the small regions of an image screen and then outputs a maximum value of the average values thus obtained. However, instead, an average value of a plurality of greater ones of the average values for the small regions may be produced. Further, the decision circuit 103 may alternatively determine and produce a difference between the output signal "Peak" of the first level detection circuit 101 and the output signal "Ave" of the second level detection circuit 102 to obtain substantially the same effect.

A second embodiment has the same block construction as the first embodiment with a variation in the function of the second level detection circuit 102.

The second level detection circuit 102, as shown in FIG. 8, divides the image screen into 25 blocks (B1 to B25) and determines an average value within each of the blocks B1 to B25. Then, the average values of the respective blocks are introduced into a computation circuit such as a microcomputer and are processed in the manner described below.

Firstly, the average values of the blocks (B1 to B25) are rearranged in the order sequentially descending from the greatest average value. Twenty five pieces of data thus arranged in the descending order are denoted by S1, S2, S3, . . . S25.

Secondly, an arithmetic mean of the rearranged data (S1, S2, S3, . . . , S25), except for the data of the extremely bright part corresponding to a light source or the like and the data of the extremely dark part corresponding to a shadow or the like, is obtained and outputted. If the H-th to L-th pieces of the data rearranged in the descending order are used to produce an arithmetic mean thereof, and the resultant arithmetic mean output is denoted by Ave, then, $$\text{Ave} = \frac{1}{N} \sum_{K=H}^{L} S_K \ (1 \leq H \leq L \leq 25, N = L - H + 1) \quad (6)$$

If H is 5 and L is 21, for an example, the influence of the bright and dark parts of an image screen can be removed by 16%, respectively. With an increase in the value H, the influence of a greater area of the bright part such as a light source can be removed.

The second level detection circuit 102 may alternatively produce an arithmetic mean of the data except for the extremely bright part of the image screen including a light source or the like. As an example, H and L may be set to 5 and 25, respectively, to thereby remove the influence of the extremely bright part by 16%. Also, only the influence of the extremely dark part corresponding to a shadow or the like may be removed. As an example, the influence of the extremely dark part may be removed by 16% by setting H and L to 1 and 21, respectively.

As will be seen from the foregoing description, according to this embodiment, the level of a main object is detected more accurately by using data other than the data of the extremely bright part corresponding to a light source or the like and/or the extremely dark part corresponding to a shadow or the like. As a consequence, it is possible to control the stop to provide proper exposure as to a main object, thereby producing a high quality image.

A third embodiment has the same block construction as the second embodiment with another variation in the function of the second level detection circuit 102.

The second level detection circuit 102, as in the second embodiment, divides the image screen into 25 blocks and determines average values B1 to B25 for the respective blocks. Then, the average values for the respective blocks are introduced into a computation circuit such as a microcomputer.

From among the average values B1 to B25 for the respective blocks, the computation circuit produces an arithmetic mean of the data of B7, B8, B9, B12, B13, B14, B17, B18, B19, B22, B23 and B24 shown in FIG. 9. If the arithmetic mean is denoted by Ave, Ave=(B7+B8+B9+B12+B13+B14+B17+B18+B19+B22+B23+B24)/12.  (7)

In this method, the second level detection circuit 102 uses the data located at a center part of the image screen. Thus, when picking up an image of an object including a bright part corresponding to a light source or the like positioned at a center part of the image screen, the output value Ave of the second level detection circuit 102 obtained by this method becomes higher than the output value of the second level detection circuit 102 of the first embodiment, with the result that the output signal K of the decision circuit 103 determined by the equation (4) becomes smaller. Therefore, the stop control is changed to have a signal saturation eliminating characteristic, depending on the size of a bright part at the center part of the image screen. On the other hand, when a bright part such as a light source or the like is included at a peripheral part of the image screen, the level of the output signal Ave of the second level detection circuit 102 becomes lower than that of the first embodiment, and therefore, the output signal K of the decision circuit 103 assumes a greater value, so that the stop control is changed to have a characteristic ignoring a bright part such as a light source or the like.

As described above, according to this embodiment, it is possible to realize stop control which emphasizes a center part of an image screen and to prevent a stop from being closed under the influence of a bright part such as a light source or the like positioned at a peripheral part of the image screen, thereby making it possible to obtain an excellent image.

In the second and third embodiments, the image screen may be divided into blocks of a number other than 25. In the third embodiment, the configuration of the division into blocks is not limited to the explained one, but it may be designed in a different manner, as will be obvious to those skilled in the art.

Figure 10:
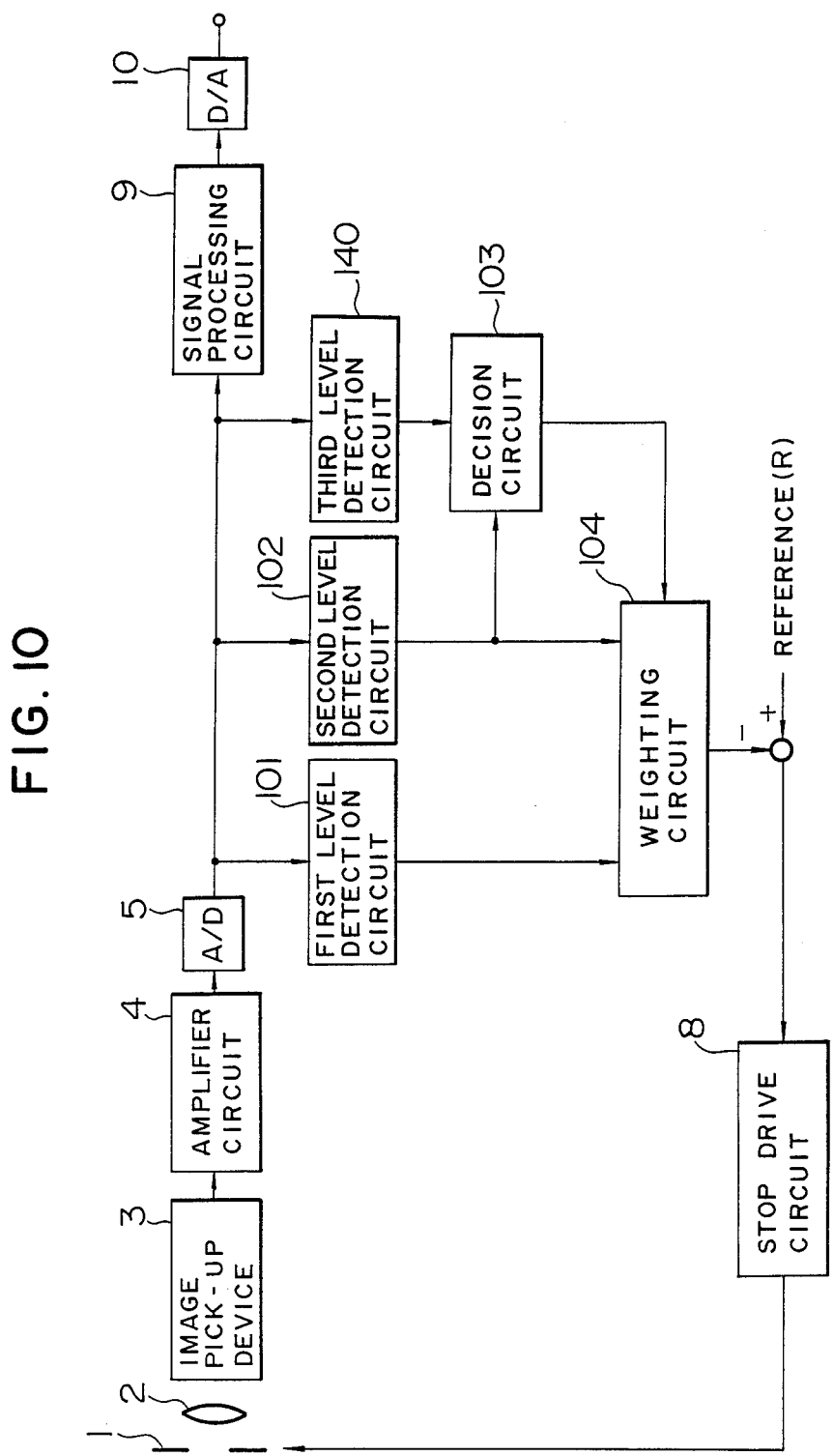
FIG. 10 is a block diagram showing a fourth embodiment of the present invention.

FIG. 10 is a block diagram showing an image pick-up system according to a fourth embodiment of the present invention. The component parts of the construction shown in FIG. 10, which are similar to the corresponding component parts of the first embodiment, are designated by the same reference numerals and will not be explained in detail.

In FIG. 10, numeral 140 designates a third level detection circuit which operates to obtain an average value for each of the regions, into which the image screen is divided and the size of each of which is smaller than in the first level detection circuit 101, and to detect a maximum value of the average values.

In the image pick-up apparatus according to this embodiment, assuming that "Peak2" denotes an output signal of the third level detection circuit 140 and "Ave" designates an output signal of the second level detection circuit 102, the decision circuit 103 determines the brightness-to-darkness ratio of an object or a sensing area by using a value of K obtained from the following equation:

$$K = \text{Peak2/Ave.} \tag{8}$$

The other operations are similar to those of the first embodiment.

In this embodiment, the third level detection circuit 140 detects a maximum value for smaller regions than in the foregoing embodiments, and therefore, even when an image of a sensing area including a small spot light source is picked up, the output signal Peak2 of the third level detection circuit 140 assumes a large value, resulting in a larger brightness-to-darkness ratio K. As a result, the apparatus of this embodiment is capable of determining a brightness-to-darkness ratio more sensitively as compared with the apparatus of the first embodiment, thereby making it possible to perform opened stop control even when a small light source is involved.

Figure 11:
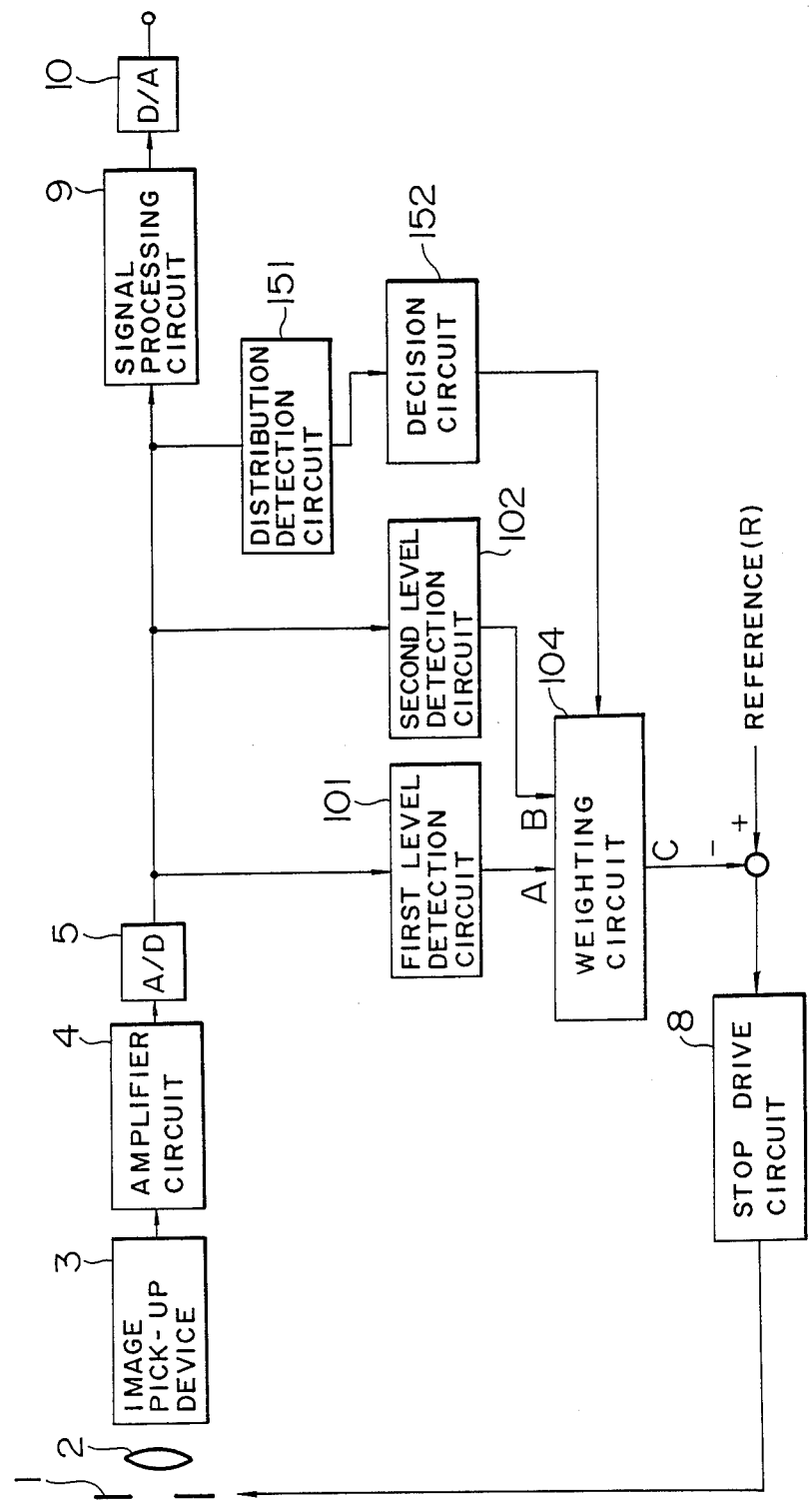
FIG. 11 is a block diagram showing a fifth embodiment of the present invention.

FIG. 11 is a block diagram showing an image pick-up apparatus according to a fifth embodiment of the present invention. The component parts shown in FIG. 11, which are similar to those of the first embodiment shown in FIG. 5, are designated by the same reference numerals as those used in FIG. 5, and will not be described in detail again.

In FIG. 11, numeral 151 designates a distribution detection circuit for determining a frequency distribution representing the frequency of the amplitude of image pick-up signals, and numeral 152 designates a decision circuit for discriminating whether a frequency distribution determined by the distribution detection circuit 151 gathers weight in the part of a small amplitude (that is, a part for a dark object) or in the part of a large amplitude (that is, a part for a bright object).

The operation of the decision circuit 152 of this embodiment having the above-described construction will be explained below.

Figure 12A:
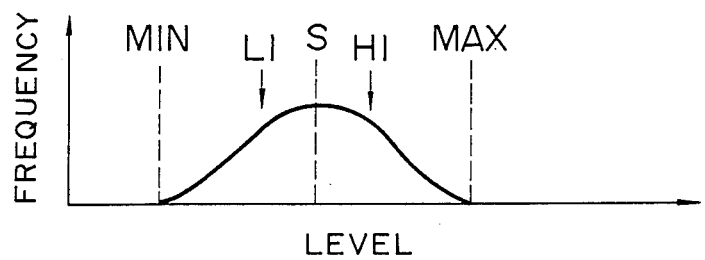
FIGS. 12A and 12B are histograms of the image pick-up signal in one field in the fifth embodiment of the present invention shown in FIG. 11.
Figure 12B:
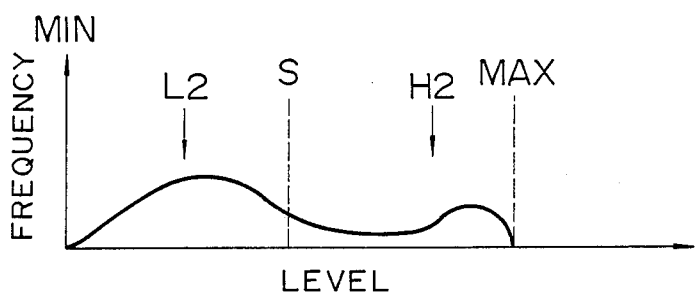

FIGS. 12A and 12B are histograms, each thereof showing a frequency distribution obtained by sampling image pick-up signals in one field. The decision circuit 152 divides into two parts a frequency distribution obtained by the distribution detection circuit 151 by a level S, and then determines and outputs a ratio between an average value of signals below the level S and that of signals above the level S. The level S is determined by the following equation (9):

$$S = (\text{MAX} + \text{MIN})/2. \tag{9}$$

where MAX denotes a maximum value of the level (amplitude) and MIN denotes a minimum value thereof. FIG. 12A shows a frequency distribution obtained when an image of an ordinary object is sensed or picked up. In FIG. 12A, L1 is an average value of signals below the level S, and H1 is an average value of signals above the level S. A ratio k1 between the two average values is obtained by k1=H1/L1. FIG. 12B shows a frequency distribution obtained when an image of an object is picked up against counter-light. In FIG. 12B, L2 is an average value of signals below the level S, and H2 is an average value of signals above the level S. A ratio between the two average values is obtained by k2=H2/L2. When an image of an object is picked up against counter-light, the brightness-to-darkness ratio becomes large and the frequency distribution gathers weight in two parts of large and small amplitudes, respectively, and therefore, k1 becomes smaller than k2. It is thus possible to discriminate whether counter-light is present or not on the basis of the magnitude of an output signal of the decision circuit 152.

As explained above, according to this embodiment, the brightness-to-darkness ratio of an object can be determined precisely, when the frequency distribution for the object determined by the distribution detection circuit 151 is clearly divided into two respective parts of large and small amplitudes.

Further, it is possible to obtain substantially the same effect as in the above-described embodiment by making the decision circuit 152 determine a difference between the average value of signals above the level S and the average value of signals below the level S and by controlling the weighting circuit 104 to increase the weight of an output signal of the second level detection circuit 102 when the difference is large, while, to increase the weight of an output signal of the first level detection circuit 101 when the difference is small.

Figure 13:
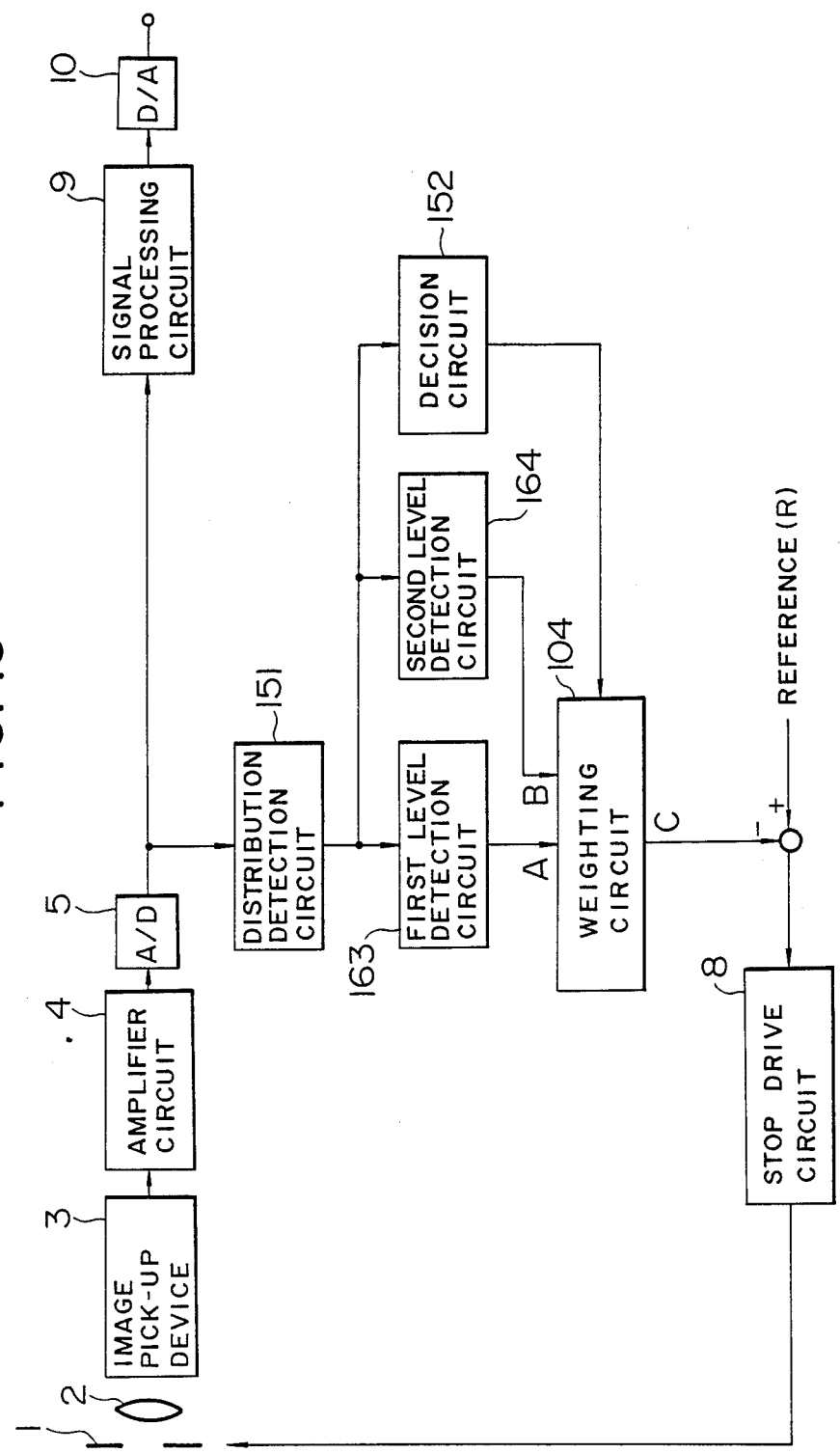
FIG. 13 is a block diagram showing sixth and seventh embodiments of the present invention.

FIG. 13 is a block diagram showing an image pick-up system according to a sixth embodiment of the present invention. In FIG. 13, the component parts similar to those of the fifth embodiment shown in FIG. 11 are designated by the same reference numerals as those used in FIG. 11, and will not be described in detail again.

In FIG. 13, numeral 163 designates a first level detection circuit for detecting a signal having a large amplitude, namely, a substantial peak value, from a frequency distribution obtained by the distribution detection circuit 151, and numeral 164 designates a second level detection circuit for detecting an average level of an image pick-up signal from the frequency distribution obtained by the distribution detection circuit 151.

The operation of an image pick-up apparatus according to the sixth embodiment constructed as described above will be explained below.

Figure 14A:
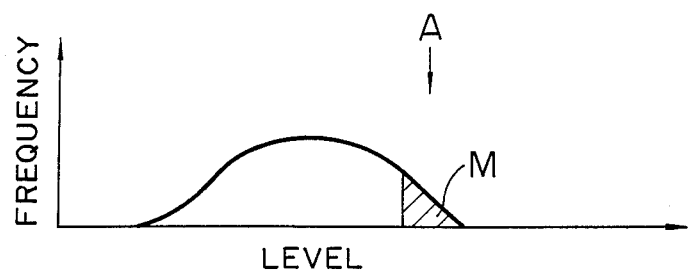
FIGS. 14A and 14B and FIG. 15 are respectively histograms of the image pick-up signal in one field in the sixth and seventh embodiments of the present invention shown in FIG. 13.
Figure 14B:
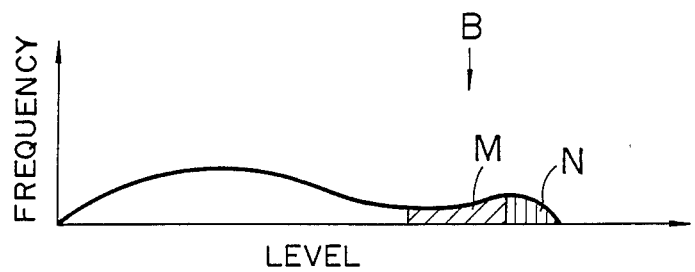

The first level detection circuit 163 and the second level detection circuit 164 obtain respective levels in the manner described below. FIGS. 14A and 14B are histograms each of which shows a frequency distribution obtained in the same manner as shown in FIGS. 12A and 12B. FIG. 14A shows a frequency distribution obtained when picking up an image of an ordinary object. The first level detection circuit 163 obtains and outputs an average value A of signals of a number M, shown by oblique hatching, which corresponds to 20% of the total frequency in the distribution range of greater amplitudes. FIG. 14B shows a frequency distribution obtained when picking up an image of an object against counter-light. The second level detection circuit 164 obtains and outputs an average value B of signals of a number M, shown by oblique hatching, corresponding to 20% of the total frequency in the distribution range of greater amplitudes from which distribution range signals of a number N, shown by vertical hatching, corresponding to 10% of the total frequency counted from a signal having the greatest amplitude have been excluded. It is thus possible to detect a true level of a sensing area disregarding a distribution at a high level which has been caused by a light source or the like, and, if the stop is controlled by an output signal of the second level detection circuit 164, the detection level of the level detection circuit is reduced as compared with a conventional stop control circuit, whereby it is made possible to perform opened stop control.

As described above, according to this embodiment, it is possible to obtain an effect similar to that of the third embodiment by using the distribution detection circuit 151.

A seventh embodiment has the same block construction as the sixth embodiment with a variation in the function of the second level detection circuit 164.

Figure 15:
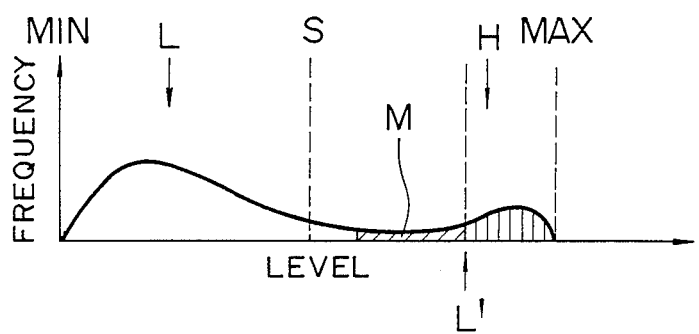

FIG. 15 is a histogram showing a frequency distribution obtained when an image of an object is picked up against counter-light, in the same manner as FIG. 12B. The decision circuit 152, as explained with reference to the fifth embodiment, divides a frequency distribution into two parts by a level S, and determines an average value L of signals below the level S and an average value H of signals above the level S, and then obtains and outputs a ratio K between the two average values by the equation of $K=H/L$. The second level detection circuit 164 obtains a level L' by multiplying the average value L of signals below the level S by five, for example, and then obtains and outputs an average value of signals of a number M, shown by oblique hatching, corresponding to 20%, for example, of the total frequency in the distribution range of greater amplitudes from which distribution range signals above the level L' included in the region shown by vertical hatching have been excluded.

As explained above, according to this seventh embodiment, the second level detection circuit 164 disregards signals whose level exceeds a level several times as high as the signal level L which signals represent a dark part of an image of an object picked up against counter-light. Therefore, it is possible to detect the level of an object other than a light source or the like without being subject to the influence of the light source or the like even when the light source or the like occupies a large proportion of the image screen. As a result, it becomes possible to obtain an excellent image by preventing an image of an object from becoming dark in the same manner as in the fifth embodiment.

In the sixth embodiment, the second level detection circuit 164 obtains a frequency distribution from which signals of a number N corresponding to 10% of the total frequency counted from a signal having the greatest amplitude have been excluded. Here, as the value of N is increased, a larger light source is disregarded, while, as the value of N is decreased, a smaller light source is disregarded. Thus, the value of N is not limited to the figure specified above.

In the sixth and seventh embodiments, the second level detection circuit 164 and the first level detection circuit 163 operate to obtain an average value of signals of a number M corresponding to 20% of the total frequency. If the value of M is increased, the stop control approaches average value control, while, if the value of M is reduced, the stop control approaches peak value control. Thus, by changing the value of M, therefore, the stop characteristic can be changed freely. Further, if, in the sixth embodiment, the second level detection circuit 164 obtains and outputs an average value of signals corresponding to 100% of the total frequency, without excluding signals of a number N, the output level of the second level detection circuit 164 becomes lower than that of the first level detection circuit 163. Therefore, if the stop is controlled by an output of the second level detection circuit 164, it becomes possible to perform opened stop control, and thus to obtain the same effect as that obtained in the first embodiment.

Further, in the fifth, sixth and seventh embodiment, the decision circuit 152 divides a frequency distribution into two parts by the level S obtained by the equation (9). The level S is not necessarily determined by the equation (9). In the seventh embodiment, the level L' is determined by multiplying the average value L of signals below the level S by the multiplier of five. If a smaller multiplier is used, however, it becomes possible to perform more widely opened stop control than that of sixth embodiment, and vice versa.

While specific embodiments of the invention have been illustrated and described herein, it will be apparent that modifications and changes of the embodiments would occur to those skilled in the art. It is therefore to be understood that the appended claims are intended to cover all the modifications and changes falling within the true spirit and scope of this invention.

We claim:

1. A light signal control circuit for an image pick-up apparatus comprising:
   an image pick-up device producing image pick-up signals;
   an average value detection circuit for detecting a value which is substantially an average value of image pick-up signals corresponding to the brightness of a sensing area and producing a first signal corresponding to the detected substantially average value;
   a peak value detection circuit for detecting a value which is substantially a peak value of the image pick-up signals and producing a second signal corresponding to the detected substantially peak value;
   a decision circuit for detecting one of a ratio and a difference between the detected substantially average value and the detected substantially peak value of the image pick-up signals and producing a third signal corresponding to said one of the ratio and the difference;
   a switching circuit for determining which one of a fourth signal corresponding to the first signal and a fifth signal corresponding to the second signal should be outputted on the basis of the third signal;
   control means for controlling a magnitude of a light signal applied to said image pick-up device; and
   a drive circuit for driving said control means on the basis of an output of said switching circuit.

2. The circuit according to claim 1, wherein said peak value detection circuit detects and provides a maximum value of the average values of the image pick-up signals in small regions of said sensing area, and said average value detection circuit detects and produces an average value of the image pick-up signals in a region greater than the small region of said sensing area.

3. The circuit according to claim 1, wherein said peak value detection circuit detects a maximum one of average values of the image pick-up signals in respective regions of a plurality of regions into which said sensing area has been divided.

4. The circuit according to claim 1, wherein said peak value detection circuit produces an arithmetic mean of a predetermined number of larger average values among average values of the image pick-up signals in respective regions of a plurality of regions into which said sensing area has been divided.

5. The circuit according to claim 1, wherein said average value detection circuit produces an arithmetic mean of average values other than a predetermined number of larger average values among average values of the image pick-up signals in respective regions of a plurality of regions into which said sensing area has been divided.

6. The circuit according to claim 1, wherein said average value detection circuit produces an arithmetic mean of average values other than a predetermined number of smaller average values among average values of the image pick-up signals in respective regions of a plurality of regions into which said sensing area has been divided.

7. The circuit according to claim 1, wherein said average value detection circuit produces an arithmetic mean of average values other than a predetermined number of larger average values and a predetermined number of smaller average values among average values of the image pick-up signals in respective regions of a plurality of regions into which said sensing area has been divided.

8. The circuit according to claim 1, wherein said average value detection circuit produces an average value of the image pick-up signals covering one whole image on said sensing area.

9. The circuit according to claim 1, wherein said average value detection circuit produces an average value of the image pick-up signals at a substantially center part of said sensing area.

10. The circuit according to claim 1, wherein said decision circuit compares an output of said average value detection circuit with an output of said peak value detection circuit.

11. A light signal control circuit for an image pick-up apparatus comprising:
   an image pick-up device;
   an average value detection circuit for detecting a value which is substantially an average value of image pick-up signals corresponding to the brightness of a sensing area and producing a first signal corresponding to the detected substantially average value;
   a peak value detection circuit for detecting a value which is a substantially peak value of the image pick-up signals and producing a second signal corresponding to the detected substantially peak value;
   a decision circuit for detecting one of the ratio and the difference between the detected substantially average signals using said first and second signals and producing a third signal corresponding to said one of the ratio and the difference;
   a weighting circuit for producing a fourth signal obtained by applying predetermined weighting factors respectively to the first signal and the second signal on the basis of the third signal;
   control means for controlling a magnitude of a light signal applied to said image pick-up device; and
   a drive circuit for driving said control means on the basis of the fourth signal outputted from the weighting circuit.

12. The circuit according to claim 11, wherein said peak value detection circuit detects and provides a maximum value of the average values of the image pick-up signals in small regions of said sensing area, and said average value detection circuit detects and produces an average value of the image pick-up signals in a region greater than the small region of said sensing area.

13. The circuit according to claim 11, wherein said peak value detection circuit detects a maximum one of average values of the image pick-up signals in respective regions of a plurality of regions into which said sensing area has been divided.

14. The circuit according to claim 11, wherein the peak value detection circuit produces an arithmetic mean of a predetermined number of larger average values among average values of the image pick-up signals in respective regions of a plurality of regions into which said sensing area has been divided.

15. The circuit according to claim 11, wherein said average value detection circuit produces an arithmetic mean of average values other than a predetermined number of larger average values among average values of the image pick-up signals in respective regions of a plurality of regions into which said sensing area has been divided.

16. The circuit according to claim 11, wherein said average value detection circuit produces an arithmetic mean of average values other than a predetermined number of smaller average values among average values of the image pick-up signals in respective region of a plurality of regions into which said sensing area has been divided.

17. The circuit according to claim 11, wherein said average value detection circuit produces an arithmetic mean of average values other a predetermined number of larger average values and a predetermined number of smaller average values among average values of the image pick-up signals in respective regions of a plurality of regions into which said sensing area has been divided.

18. The circuit according to claim 11, wherein said average value detection circuit produces an average value of the image pick-up signals covering one whole image on said sensing area.

19. The circuit according to claim 11, wherein said average value detection circuit produces an average value of the image pick-up signal at a substantially center part of said sensing area.

20. The circuit according to claim 11, wherein said decision circuit compares an output of said average value detection circuit with an output of said peak value detection circuit.

21. A light signal control circuit for an image pick-up apparatus comprising:
   an image pick-up device;
   a distribution detection circuit for detecting a frequency distribution in respect of brightness of a plurality of image pick-up signals corresponding to respective brightness of a plurality of regions into which a sensing area has been divided;
   a decision circuit for producing a first signal corresponding to a distribution condition of the frequency distribution;
   an average value detection circuit for detecting a value which is substantially an average value of image pick-up signals corresponding to the brightness of said sensing area and producing a second signal corresponding to the detected substantially average value;
   a peak value detection circuit for detecting a value which is substantially a peak value of the image pick-up signals and producing a third signal corresponding to the detected substantially peak value;
   a weighting circuit for producing a fourth signal obtained by applying predetermined weighting factors respectively to the second signal and the third signal on the basis of the first signal and adding up the weighted second signal and the weighted third signal;

control means for controlling a magnitude of a light signal applied to said image pick-up device; and a drive circuit for driving said control means on the basis of the fourth signal outputted from the weighting circuit.

22. The circuit according to claim 21, wherein said peak value detection circuit produces an average value of a predetermined number of frequencies in the highest brightness range of said frequency distribution.

23. The circuit according to claim 21, wherein said average value detection circuit produces an average value of all the frequencies of the frequency distribution.

24. The circuit according to claim 21, wherein said peak value detection circuit produces an average value of a predetermined number of frequencies in the highest brightness range of the frequency distribution, and said average value detection circuit produces an average value of a number of frequencies which is greater than the predetermined number.

25. The circuit according to claim 21, wherein said average value detection circuit produces an average value of a predetermined number of frequencies belonging to a part of the frequency distribution excluding a predetermined number of frequencies in the highest brightness range of the frequency distribution.

26. The circuit according to claim 21, wherein said average value detection circuit multiplies an average value of a predetermined number of frequencies in the lowest brightness range of the frequency distribution by a predetermined multiplier, and produces an average value of a predetermined number of frequencies belonging to a part of the frequency distribution excluding frequencies having values greater than the multiplied average value.

27. The circuit according to claim 21, wherein said decision circuit divides the frequency distribution into two parts according to a predetermined frequency value, and decides a ratio between an average value of frequencies in the frequency distribution below the predetermined frequency value and an average value of frequencies in the frequency distribution above the predetermined frequency value.

* * * * *